United States Patent
Fisher (10) Patent No.: US 8,099,543 B2
(45) Date of Patent: Jan. 17, 2012

(54) METHODS OF OPERARTING MEMORY DEVICES WITHIN A COMMUNICATION PROTOCOL STANDARD TIMEOUT REQUIREMENT

(75) Inventor: Ryan G. Fisher, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 409 days.

(21) Appl. No.: 12/364,923

(22) Filed: Feb. 3, 2009

(65) Prior Publication Data

US 2010/0199019 A1    Aug. 5, 2010

(51) Int. Cl.
G06F 12/00 (2006.01)
G06F 13/00 (2006.01)
G06F 13/28 (2006.01)
(52) U.S. Cl. ........................ 711/103; 711/154
(58) Field of Classification Search ............ 711/103
See application file for complete search history.

(56) References Cited

U.S. PATENT DOCUMENTS

| | | | |
|---|---|---|---|
| 7,295,470 B2 | 11/2007 | Park et al. | |
| 7,362,611 B2 | 4/2008 | Roohparvar | |
| 7,466,597 B2 | 12/2008 | Kim | |
| 2008/0086619 A1* | 4/2008 | Traister et al. | 711/170 |
| 2008/0212371 A1 | 9/2008 | Roohparvar | |

* cited by examiner

*Primary Examiner* — Reginald Bragdon
*Assistant Examiner* — Stella Eun
(74) *Attorney, Agent, or Firm* — Brooks, Cameron & Huebsch, PLLC (57) ABSTRACT

The present disclosure includes methods and devices for logical memory blocks. One method for operating a memory device includes receiving a command to operate X pages of the memory device, X being greater than Y, and executing the command by executing multiple subcommands, each subcommand operating on a logical memory block portion of the X pages, each logical memory block including at most Y pages. T is a timeout limit, N is a number of pages comprising a block of memory, and Y is number of pages that can be operated within time T.

21 Claims, 5 Drawing Sheets

METHODS OF OPERARTING MEMORY DEVICES WITHIN A COMMUNICATION PROTOCOL STANDARD TIMEOUT REQUIREMENT

TECHNICAL FIELD

The present disclosure relates generally to semiconductor memory devices, methods, and systems, and more particularly, to logical memory blocks.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory.

An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may ameliorate seek time, latency, and other electromechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more such things; for example, a number of memory devices can refer to one or more memory devices). As one of ordinary skill in the art will appreciate, a memory chip can include a number of dies. Each die can include a number of memory arrays and peripheral circuitry thereon. A memory array can include a number of planes, with each plane including a number of physical blocks of memory cells. Each physical block can include a number of pages of memory cells that can store a number of sectors of data.

Some communication protocol standards have timeout requirements associated with them that limit the amount of time a device compliant to that standard may ignore the host system or an application. As the size of memory cells decreases, and the density of memory cells increases, certain memory operations can involve larger quantities of memory cells that can exceed communication protocol standard timeout requirements.

DETAILED DESCRIPTION

The present disclosure includes methods and devices for logical memory blocks. One method for operating a memory device includes receiving a command to operate X pages of the memory device, X being greater than Y, and executing the command by executing multiple subcommands, each subcommand operating on a logical memory block portion of the X pages, each logical memory block including at most Y pages. T is a timeout limit, N is a number of pages comprising a block of memory, and Y is number of pages that can be operated within time T.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M" and "N," and "Z," particularly with respect to reference numerals in the drawings, indicates that a number of the particular feature so designated can be included with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

Figure 1:
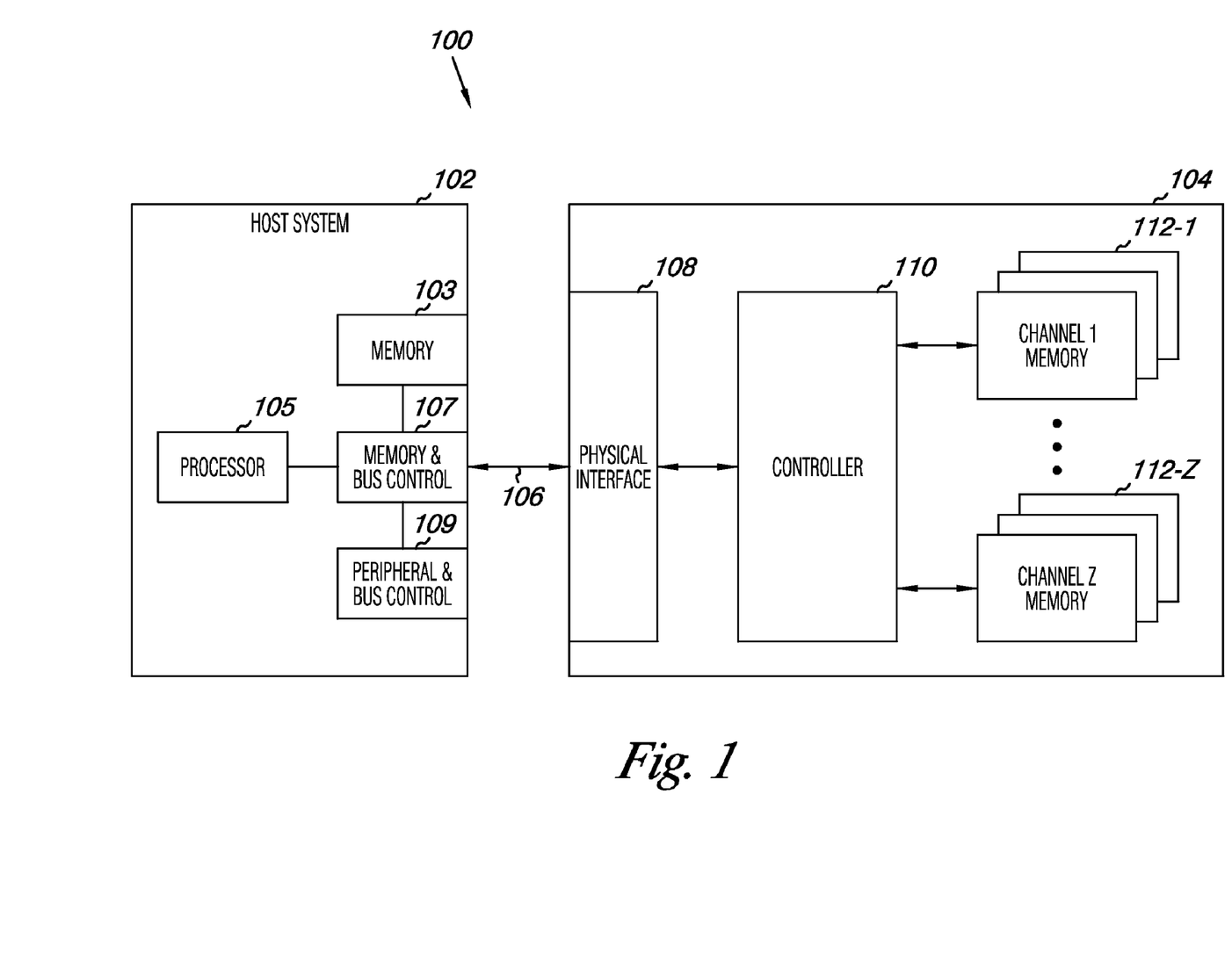
FIG. 1 is a block diagram of a computer system with an electronic memory system having at least one memory device operated in accordance with one or more embodiments of the present disclosure.

FIG. 1 is a functional block diagram of a computing system in accordance with one or more embodiments of the present disclosure. Computing system 100 includes a host system 102 communicatively coupled to a memory system 104, e.g., one or more solid state drives (SSDs). Memory system 104 can be communicatively coupled to the host system 102 through a communication interface 106, e.g., a Serial Advanced Technology Attachment (SATA) interface.

The host system 102 can include a number of separate integrated circuits, or more than one component or function can be on the same integrated circuit. According to one or more embodiments, the host system 102 can be physically implemented in a computing system 100, at least in part, as a "motherboard," with the memory system 104 being physically implemented separately, the motherboard and memory system 104 being communicatively coupled through a communication interface 106, such as by a backplane or bus.

Host system 102 can include one or more processors 105, e.g., parallel processors, co-processors, etc., communicatively coupled to a memory and bus control 107. Processor 105 can be one or more microprocessors, or some other type of controlling circuitry such as one or more application-specific integrated circuits (ASICs), for example. Other components of the computing system may also have processors. The memory and bus control 107 can have memory 103 and other components directly communicatively coupled thereto, for example, a peripheral and bus control 109 (which in turn, can connect to a number of devices, such as a flash drive using a universal serial bus (USB) interface, a non-volatile memory host control interface (NVMHCI) flash memory, or user interfaces).

The memory system 104 can be used in addition to, or in lieu of, a hard disk drive (HDD) in a number of different computing systems. Enterprise solid state storage appliances are a class of memory systems that can be characterized by one or more terabytes of storage and fast performance capabilities, for example 100 Mb/sec, 100K inputs/outputs per second (IOPS), etc. According to one or more embodiments of the present disclosure, an enterprise solid state storage appliance can be configured using SSD building blocks. For example with respect to FIG. 1, the memory system 104 may be an enterprise solid state storage appliance implemented using one or more component SSDs, the one or more SSDs being operated as a memory system by a memory system controller. The computing system 100 illustrated in FIG. 1 is one example of such a system; however, embodiments of the present disclosure are not limited to the configuration shown in FIG. 1.

The memory system 104, e.g., an SSD, includes a system controller 110, a physical interface 108, e.g., a connector, and a number of memory devices 112-1, ..., 112-Z, corresponding to respective channels of the system controller 110. The interface 106 is used to communicate information between the memory system 104 and the host system 102.

System controller 110 may include control circuitry for controlling access across a number of channels, each channel having a channel memory controller corresponding to the number of memory devices 112-1, ..., 112-Z. Each channel memory controller can manage access to the corresponding memory devices 112-1, ..., 112-Z, including providing mapping between physical and logical address associated with a particular channel. Additionally, each channel memory controller, e.g., 118-1, ..., 118-N, manages wear leveling for the memory devices associated with the particular channel. The memory system 104 can integrate all the logic for interfacing to a host system and to control the number of memory devices 112-1, ..., 112-Z in a way that emulates a disk drive.

Each of the number of memory devices 112-1, ..., 112-Z can include a number of memory cells. The memory devices 112-1, ..., 112-Z can be formed using various types of volatile or non-volatile memory arrays, e.g., NAND flash, DRAM, among others. According to one or more embodiments of the present disclosure, the memory devices 112-1, ..., 112-Z can include a number of floating gate flash memory cells arranged in a NAND architecture, a NOR architecture, an AND architecture, or some other memory array architecture, one or more of which may be used in combination. For example, the control gates of memory cells of a "row" can be coupled with a word line, while the drain regions of the memory cells of a "column" can be coupled to bit lines. The source regions of the memory cells can be coupled to source lines. Memory devices 112-1, ..., 112-Z can include a number of memory cells that can be arranged to provide particular physical or logical configurations, such as a page, block, plane, array, or other group.

Figure 2:
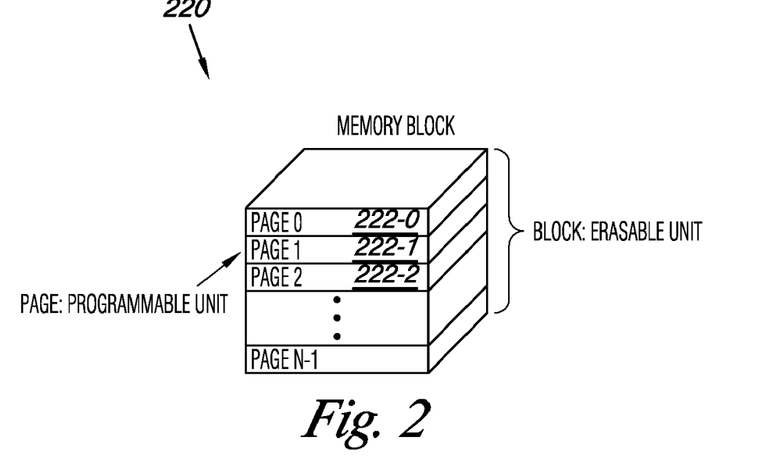
FIG. 2 illustrates a memory block in accordance with one or more embodiments of the present disclosure.

FIG. 2 illustrates a memory block in accordance with one or more embodiments of the present disclosure. Memory block 220 can include a number of pages, e.g., 222-0, 222-1, 222-2, etc. For instance, memory block 220 can include N pages, as shown in FIG. 2. As used herein, a page of memory cells means a number of memory cells that are programmable at one time, e.g., the smallest programmable logical unit. For example, some memory arrays can include a number of pages of memory cells that make up a block of memory cells. As used herein, a block of memory cells means a number of memory cells that are erasable at one time, e.g., the smallest erasable logical unit. A number of blocks can be included in a plane of memory cells. A number of planes of memory cells can be included on a die. An array can include one or more die. By way of example, and not of limitation, a 128 Gb memory device can include 4314 bytes of data per page (of which a portion of the page size is used for controller overhead leaving about 4096 bytes available for user storage), 128 pages per block, 2048 blocks per plane, and 16 planes per device, with some allowance for memory management overhead and spare blocks.

Figure 3:
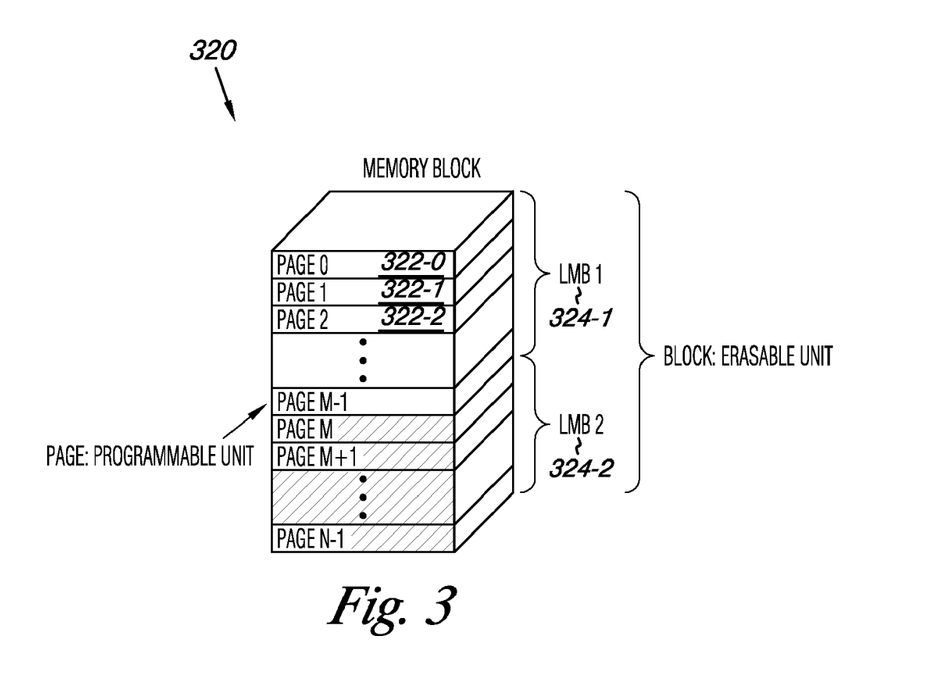
FIG. 3 illustrates a memory block having a number of logical memory blocks in accordance with one or more embodiments of the present disclosure.

FIG. 3 illustrates a memory block having a number of logical memory blocks in accordance with one or more embodiments of the present disclosure. Memory block 320 can include a number of pages, e.g., 322-0, 322-1, 322-2, etc. For instance, memory block 320 can include N pages, as shown in FIG. 3, where a memory block is the smallest logical unit, e.g., group, of memory cells that are erasable at one time, and a page is the smallest logical unit, e.g., group, of memory cells that are programmable at one time. Memory block 320 can include a number of logical memory blocks (LMBs). In the embodiment illustrated in FIG. 3, memory block 320 includes two LMBs, e.g., LMB1 324-1 and LMB-2 324-2. However, a memory block can include from 1 to N LMBs, where N is the number of pages included in the memory block. Therefore, an LMB can include from 1 to N pages. According to one or more embodiments an LMB can include a particular percentage of the N pages comprising a memory block, e.g., 50%, 33%, etc.

Some communication protocols have timeout requirements associated with them that limit the amount of time, e.g., T, a device compliant to that standard may ignore a host system or application. Generally, a device compliant to a particular standard needs to execute and indicate completion of a particular command within the corresponding time limit, e.g., T, to prevent the host system or application from taking timeout action. Examples can include the timeout specification of the Multi-Media Card (MMC) and Secure Disk (SD) communication protocol standards. A particular protocol timeout requirement, e.g., an SD WRITE timeout limit, can be 250 mS for example. A host system or application can monitor an SD compliant bus for certain activity within the 250 mS time limit, for example, taking predefined actions when the time limit is exceeded.

Some commands of a host system or application require more time to complete than others, since they may involve several steps, or operate on larger quantities of data. Examples of such limiting data management functions can include a BLOCK COPY operation, such as an INTERNAL DATA MOVE (IDM) operation or a COPYBACK operation. Other command or combinations of commands that achieve similar functionality of moving quantities of data, e.g., up to all pages of a memory block, either internally within a memory device, or from one memory device to another. Internal data moving operations may, or may not, include moving data out of a particular memory device, e.g., for data integrity or other checking functionality, and writing the data back into the same particular memory device.

BLOCK COPY operations may be used to implement wear leveling techniques. Wear leveling logic can implement techniques for managing wear leveling. As used herein, managing wear leveling includes bad block management. These techniques can include rotating the cells among the memory devices to which data is written. Wear leveling can also include a technique called garbage collection in which blocks with a number of invalid pages (e.g., pages with data that has been re-written to a different page and/or is no longer needed on the invalid pages) are reclaimed by erasing the block. Garbage collection entails rearranging data among memory devices to account for the dynamic or static nature of the data. Garbage collection included in the wear leveling techniques can be helpful in managing the wear rate of the individual cells of a particular memory device. These wear leveling techniques do not limit the amount of data that is written on memory system, and they do not account for the rate of writing data and the time period over which data is written on the device as being a factor that can affect the performance of the drive.

In various embodiments, wear leveling can include dynamic wear leveling to minimize the amount of valid blocks moved to reclaim a block. In dynamic wear leveling, the data blocks with the highest amount of invalid pages can be reclaimed. A page or block of cells in a memory array can be reclaimed by moving valid data from the page or block from a first location to a second page or block location and erasing the first page or block location. Valid data can be data that is desired and should be preserved in memory cells, while invalid data can be data that no longer is desired and can be erased. A threshold for number of total invalid pages in a block can be set to determine if a block will be reclaimed. Particular blocks can be reclaimed by scanning the block table for blocks that have a number of invalid pages above the threshold. A block table can have information detailing the type, location, and status, among other things, for the data in memory cells.

Static wear leveling includes writing static data to blocks that have high erase counts to prolong the life of the block. In static wear leveling, blocks that are storing static data can be exchanged with blocks that have high erase counts so that the blocks with static data, and corresponding lower erase counts, are reclaimed. Blocks that have high erase counts now have static data, therefore reducing the erase rate for that block.

In some embodiments, a number of blocks can be designated as spare blocks to reduce the amount of write amplification associated with writing data among the memory devices. A spare block can be a block in a memory device that can be designated as a block where data can not be written. Write amplification is a process that occurs when writing data to solid state memory devices. When randomly writing data in a memory system, a scan for free space in the system is made. Free space in a memory system can be individual cells, pages, and/or blocks of memory cells that are not programmed, in one or more memory devices. If there is enough free space to write the data, then the data is written to the free space in the memory system. If there is not enough free space in one location, the data in the memory system is rearranged by erasing, moving, and rewriting the data that is already present in the memory system to a new location leaving free space for the new data that is to be written in the memory system. The rearranging of old data in the memory system is called write amplification because the amount of writing the memory system has to do in order to write new data is amplified based upon the amount of free space in the memory system and the size of the new data that is to be written to the memory system. Write amplification can be reduced by increasing the amount of space in a memory system that is designated as free space (e.g., where static data will not be written), thus allowing for less amplification of the amount of data that has to be written because less data will have to be rearranged.

By way of example, and not by way of limitation, one embodiment of a BLOCK COPY operation involving a block of memory can include:

1. Determining whether an erased destination NAND Flash memory block is available.
2. Erasing a destination NAND Flash memory block when an erased destination NAND Flash memory block is not already available.
3. Reading the contents of a page from a source memory block. Optionally, the contents of a page from a source memory block can be read out of the memory device containing the source memory block to check for and/or correct for data propagation errors, e.g., data integrity.
4. Programming, e.g., writing, the (raw or corrected) contents of the page from the source memory block to a page in the destination NAND Flash memory block.
5. Repeating steps 2-4 above, up to N times, where N is the maximum number of pages in a memory block for the NAND Flash device. The source block of memory being moved is not limited to being all from the same physical block within the NAND Flash device, e.g., a quantity of data to be programmed to a destination memory block may be derived from one or more source physical blocks.

The time required to perform a BLOCK COPY operation depends on several factors such as performance of the memory device for READ, PROGRAM, and ERASE (if needed) operations, the size of each page, the number of planes included in a memory device, input/output performance of the memory device, the number of pages per block to be copied, and the amount of memory system controller overhead used to execute firmware (and possibly to correct ECC errors and prevent propagation of bit errors). It is possible to limit BLOCK COPY operations to a portion of a physical memory block by dividing the physical block into two or more LMBs, and executing the BLOCK COPY operation on each LMB instead of across an entire memory block.

Previously, memory devices have had the throughput performance necessary to complete commands of a host system or application, e.g., all variations of the above-described COPYBACK operation, within the timeout requirement of a particular standard, e.g., 250 mS. Fabrication process technology enables smaller and smaller memory cell size, and increased memory cell density, the number of pages per memory block can increase to take advantage of fabrication and other operation efficiencies. However, an increased quantity of pages per block without a commensurate increase in operational speed can result in throughput performance for a memory block that is not able complete commands of a host system or application within the timeout requirement of a particular standard, e.g., 250 mS. Thus, higher density memory devices, e.g., less than 34 nm technology node, may not be used for compliant devices according to certain standards. For example, memory devices that cannot complete an IDM or COPYBACK operation within 250 mS may not be used for compliant devices according to MMC and/or SD standards.

Figure 4:
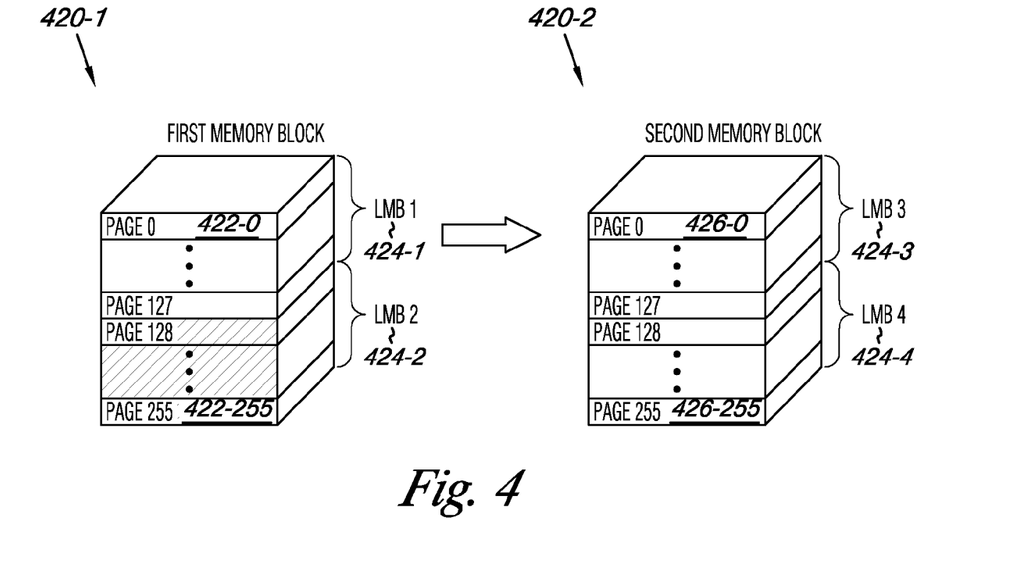
FIG. 4 illustrates a write operation from a first memory block to a second memory block in accordance with one or more embodiments of the present disclosure.

FIG. 4 illustrates a write operation from a first memory block to a second memory block in accordance with one or more embodiments of the present disclosure. As shown, first memory block 420-1 includes 256 pages, e.g., 422-0, ..., 422-255, organized into two LMBs, e.g., LMB1 424-1 and LMB-2 424-2. Similarly, second memory block 420-2 also includes 256 pages, e.g., 426-0, ..., 426-255, organized into two LMBs, e.g., LMB3 424-3 and LMB-4 424-4. FIG. 4 illustrates a process of data being written from the first memory block 420-1 to the second memory block 420-2, which will be described in further detail below.

To achieve IDM operations, COPYBACK operations, and/or combinations of other commands that achieve similar functionality within a given period, e.g., T, a memory block can be organized for certain operations into one or more LMBs.

While the memory block remains defined as the number of memory cells that are erasable at one time, and a page remains defined as the number of memory cells that are programmable at one time, by organizing the memory block to include one or more LMBs, the number of pages that are operated can be limited to a quantity that can be operated within a given period, such as the timeout time limit for a particular standard. Logically organizing, e.g., dividing, a memory block could be implemented at the memory system, e.g., controller, level via software or hardware prior to corresponding communication of commands to the memory device.

In one or more embodiments, a command to move a block of memory data that would take longer to complete than a given timeout time limit, can be broken into two or more commands to the memory device, each command operating on an LMB, with the operation on a particular one of the multiple LMBs being completable within the given timeout time limit. Referring to FIG. 4 for example, a command may be received at a memory system controller to move the contents of the first memory block 420-1, e.g., located on a particular memory device, to the second memory block 420-2, e.g., also located on the particular memory device. The memory system controller may be configured or programmed to determine that movement of the first memory block cannot be accomplished within a certain timeout limit.

Rather than issue a command to the memory device involving the entire source first memory block 420-1, the memory system issues a replaced command, e.g., a subcommand, to the memory device involving a portion of the memory block, e.g., LMB1 424-1. For example, upon receipt of a command to COPYBACK the source first memory block 420-1 to the destination second memory block 420-2, the memory system controller issues a command to COPYBACK LMB1 424-1 from the source first memory block 420-1 to LMB3 424-3 in the destination second memory block 420-2. After completion of this first subcommand, the memory system controller indicates to the source of the received command, e.g., host system or application, that the COPYBACK command is complete (and optionally, the memory system is able to receive another command), thus not exceeding the timeout limit.

The reader will appreciate that the original COPYBACK command is not actually complete, since the entire first block is not yet been entirely moved. However, many commands can take less than the full timeout limit to execute, and the memory system controller is configured or programmed to utilize available command processing time for one or more subsequent commands, or idle time, to complete moving the remainder of the first memory block 420-1, e.g., LMB2 424-2. If the next command executed by the memory system controller requires less time than the timeout limit to complete, rather than immediately indicating that the next command is complete back to the host system or application, the memory system controller can issue a second subcommand corresponding to the original COPYBACK command, e.g., to move LMB2 424-2 to LMB4 424-4 in the destination second memory block 420-2, thereby utilizing the remaining portion of the timeout period for the next command from the host system or application to actually finish (or complete another portion of) the first command from the host system or application.

For example, a common command associated with large music or graphic files is a Write Multiple command used to program, e.g., write, sequential data. According to some implementations, a Write Multiple command can program one page of memory in about 10 mS, leaving approximately 240 mS of the 250 timeout limit that may be used to execute a second subcommand, e.g., involving a second LMB of a preceding COPYBACK command. This second LMB involved with the second subcommand of a preceding COPYBACK command can include fewer pages since the second subcommand has 10 mS fewer within which to operate the second LMB.

After completion of the second subcommand (corresponding to the first COPYBACK command received from the host system or application), but before the timeout period expires for the next command from the host system or application, the memory system controller can indicate back to from the host system or application that the next command is completed. This utilization of available time within the timeout limit of subsequent commands from the host system or application may be repeated as necessary, until the first (e.g., COPYBACK) command is actually completed by the memory system controller.

The number of LMBs into which a block is logically divided up, can depend on the particular command received from the host system or application, the throughput performance of the memory device, the timeout limit, and the number of pages within a memory block, among other criteria. According to one or more embodiments, a memory block, e.g., 420-1, can be operated or configured, e.g., physically divided, into a fixed quantity of multiple LMBs, each having a predetermined size, the size being such that no operation involving an LMB will exceed an applicable communications protocol timeout requirement.

According to one or more embodiments, a memory block, e.g., 420-1, can be dynamically organized into LMBs, based on one or more of the above-mentioned criteria and the amount of time available to perform a subcommand involving an LMB. For example, where a next command has T1 time available, the LMB associated with a subcommand executed in the remaining time before timeout occurs for the next command may include P1 pages, but where the next command has T2 time available, the LMB associated with a subcommand executed in the remaining time before timeout occurs for the next command may include P2 pages. The reader will appreciate that P2 may be more than P1 where T2 is greater than T1, and vice versa.

LMBs need not be utilized only where an entire block of data is involved with a particular command, but rather may be utilized whenever more pages are involved with a particular command than can be operated within the timeout period for a particular protocol. For example, a command to operate X pages of a memory device can be received by a memory system controller, X being greater than Y, which is the number of pages that can be operated within a communication protocol standard timeout limit T. The memory system controller can execute the command by executing multiple subcommands, each subcommand operating on an LMB portion of the X pages, and each LMB including at most Y pages.

The example can be expanded to a memory block having N pages, e.g., 320 shown in FIG. 3. A command to operate N pages of a memory device can be received by a memory system controller, N being greater than Y, which is the number of pages that can be operated within a timeout limit T, e.g., communication protocol timeout limit. The memory system controller can execute the command by executing multiple subcommands, each subcommand operating on an LMB portion of the N pages, and each LMB including at most Y pages.

The LMBs of a particular memory block (or other group of pages) can all include the same number of pages, but are not so limited, e.g., LMBs can include different quantities of pages from one another. According to one or more embodiments, a first LMB, e.g., LMB1 424-1 shown in FIG. 4, can include at most a maximum number of pages that can be operated (corresponding to the original command received from a host system or application), with subsequent LMBs, e.g., LMB2 424-2 shown in FIG. 4, including fewer pages than LMB1, based on the remaining time available on a next command received from a host system or application. For example, a second LMB can include the portion of pages involved in the original command not included in the first LMBs.

According to one or more embodiments, a first LMB, e.g., LMB1 424-1 shown in FIG. 4, can include at most a maximum number of pages that can be operated (corresponding to the original command received from a host system or application), with a second LMBs, e.g., LMB2 424-2 shown in FIG. 4, including fewer pages than LMB1, but not all remaining pages involved with the original command based on the remaining time available on a first next command received from a host system or application. A third LMB can include the portion of pages involved in the original command not included in the first or second LMBs. This methodology can be extended as necessary to accommodate short remaining time periods for commands that follow the original, e.g., initial, command, or to accommodate memory blocks including a large quantity of pages relative to the communication protocol timeout period and throughput rate.

It is possible that a next command, that is a command that is received while one or more subcommands associated with a previously-received command are still pending, may involve the data from the destination of the pending subcommand. While this situation should be rare, in that situation the memory system controller can buffer the next command until such time as the pending subcommands associated with a previous command involving the same data are completed.

Figure 5:
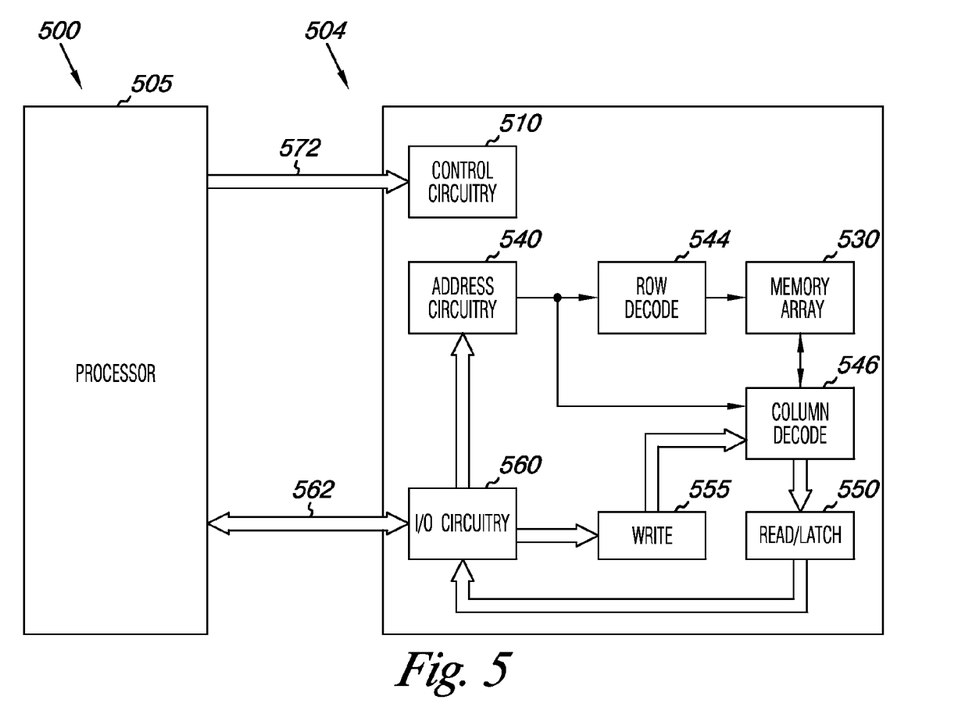
FIG. 5 illustrates a block diagram of a computing system in accordance with one or more embodiments of the present disclosure.

FIG. 5 illustrates a block diagram of a computing system 500 in accordance with one or more embodiments of the present disclosure. Computing system 500 includes a processor 505 coupled to a memory system 504 that includes one or more memory arrays 530 of non-volatile memory cells. The processor 505 can be part of a host system, e.g., 102 shown in FIG. 1, and/or can execute an application on the host system. The computing system 500 can include separate integrated circuits or both the processor 505 and the memory system 504 can be on the same integrated circuit. The processor 505 can be a microprocessor or some other type of controlling circuitry such as an application-specific integrated circuit (ASIC).

The memory system 504 includes one or more arrays of non-volatile memory cells 530, which can be floating gate flash memory cells with a NAND architecture, for example. The control gates of memory cells of a "row" can be coupled with a select line, while the drain regions of the memory cells of a "column" can be coupled to sense lines. The source regions of the memory cells can be coupled to source lines. The manner of connection of the memory cells to the sense lines and source lines depends on whether the array is a NAND architecture, a NOR architecture, an AND architecture, or some other memory array architecture.

The embodiment of FIG. 5 includes address circuitry 540 to latch address signals provided over I/O connections 562 through I/O control circuitry 560. Address signals are received and decoded by a row decoder 544 and a column decoder 546 to access the memory arrays 530. In light of the present disclosure, it will be appreciated by those skilled in the art that the number of address input connections depends on the density and architecture of the memory arrays 530 and that the number of addresses increases with both increased numbers of memory cells and increased numbers of memory blocks and arrays.

The memory system 504 senses data in the memory arrays 530 by sensing voltage and/or current changes in the memory array columns using sense/buffer circuitry that in this embodiment can be read/latch circuitry 550. The read/latch circuitry 550 can read and latch a page, e.g., a row, of data from the memory arrays 530. I/O control circuitry 560 is included for bi-directional data communication over the I/O connections 562 with the processor 505. Write circuitry 555 is included to write data to the memory arrays 530.

Control logic circuitry 510, e.g., a memory system controller, decodes signals provided by control connections 572 from the processor 505. These signals can include chip signals, write enable signals, and address latch signals (among others) that are used to control the operations on the memory arrays 530, including data read, data write, and data erase operations. The control logic circuitry 510 can send signals, e.g., commands, to selectively reset particular registers and/or sections of registers according to one or more embodiments of the present disclosure. In one or more embodiments, the control logic circuitry 510 is responsible for executing instructions from the processor 505 to perform the operations according to embodiments of the present disclosure. The control logic circuitry 510 can be a state machine, a sequencer, an ASIC, or some other type of controller. It will be appreciated by those skilled in the art that additional circuitry and control signals can be provided, and that the memory device detail of FIG. 5 has been reduced to facilitate ease of illustration.

In one or more embodiments, the memory system 504 can be a solid state drive and can implement wear leveling to control the wear rate on the memory arrays 530. As one of ordinary skill in the art will appreciate, wear leveling can increase the life of a solid state memory array since a solid state memory array can experience failure after a number of program and/or erase cycles. In various embodiments, wear leveling can include dynamic wear leveling to minimize the amount of valid blocks moved to reclaim a block. Dynamic wear leveling can include a technique called garbage collection in which blocks with a number of invalid pages (e.g., pages with data that has been re-written to a different page and/or is no longer needed on the invalid pages) are reclaimed by erasing the block. Static wear leveling includes writing static data to blocks that have high erase counts to prolong the life of the block.

In some embodiments, a number of blocks can be designated as spare blocks to reduce the amount of write amplification associated with writing data in the memory array. A spare block can be a block in a memory array that can be designated as a block where data can not be written. Write amplification is a process that occurs when writing data to solid state memory arrays. When randomly writing data in a memory array, the memory array scans for free space in the array. Free space in a memory array can be individual cells, pages, and/or blocks of memory cells that are not programmed. If there is enough free space to write the data, then the data is written to the free space in the memory array. If there is not enough free space in one location, the data in the memory array is rearranged by erasing, moving, and rewriting the data that is already present in the memory array to a new location leaving free space for the new data that is to be written in the memory array. The rearranging of old data in the memory array is called write amplification because the amount of writing the memory arrays has to do in order to write new data is amplified based upon the amount of free space in the memory array and the size of the new data that is to be written on the memory array. Write amplification can be reduced by increasing the amount of space on a memory array that is designated as free space (e.g., where static data will not be written), thus allowing for less amplification of the amount of data that has to be written because less data will have to be rearranged.

In various embodiments, host and/or user traffic and/or program/erase cycles performed by the solid state drive can be monitored, in addition to wear leveling in the solid state drive, to improve performance of the solid state drive. Host and/or user traffic requests can be made by the processor through the controller to read data and/or erase/write data on the solid state drive. Program and/or erase cycles can be monitored to determine the wear rate and life expectancy of the blocks and/or pages in the solid state memory arrays, as a solid state memory arrays can only be erased and written to a finite number of time. Host and/or user traffic trends can be monitored and altered to allow the drive to perform for a desired operational life (e.g., a time period such as hours, days, weeks, years, etc). The solid state drive can monitor and limit the number of program and/or erase cycles performed by the solid state drive, such as to ensure a desired operational life of the drive. The solid state drive can also monitor the number of program and/or erase cycles performed over a particular time period to determine how to calculate the allowable program and/or erase cycle rate for the drive given the a number of space blocks and the desired operational life of the drive.

In addition, in some embodiments, the number of spare blocks in the solid state memory arrays of the solid state drive can be controlled to ensure operability over a desired operational life for a desired number of write IOPs per unit time. The percentage of spare blocks can be optimized for the type of data that is being programmed on the solid state drive. A solid state drive that has static data (e.g., data that is stored on the drive for long periods of time without be erased and/or rewritten) can have a lower percentage of spare blocks because there is less need to reclaim blocks in the drive due to the static nature of the data having fewer program and/or erase cycles. In a solid state drive that has dynamic data (e.g., data that is programmed and/or erased more frequently) a higher percentage of spare blocks can be used to reduce the write amplification associated with having to reclaim blocks to perform program and/or erase cycles in the memory array.

Figure 6:
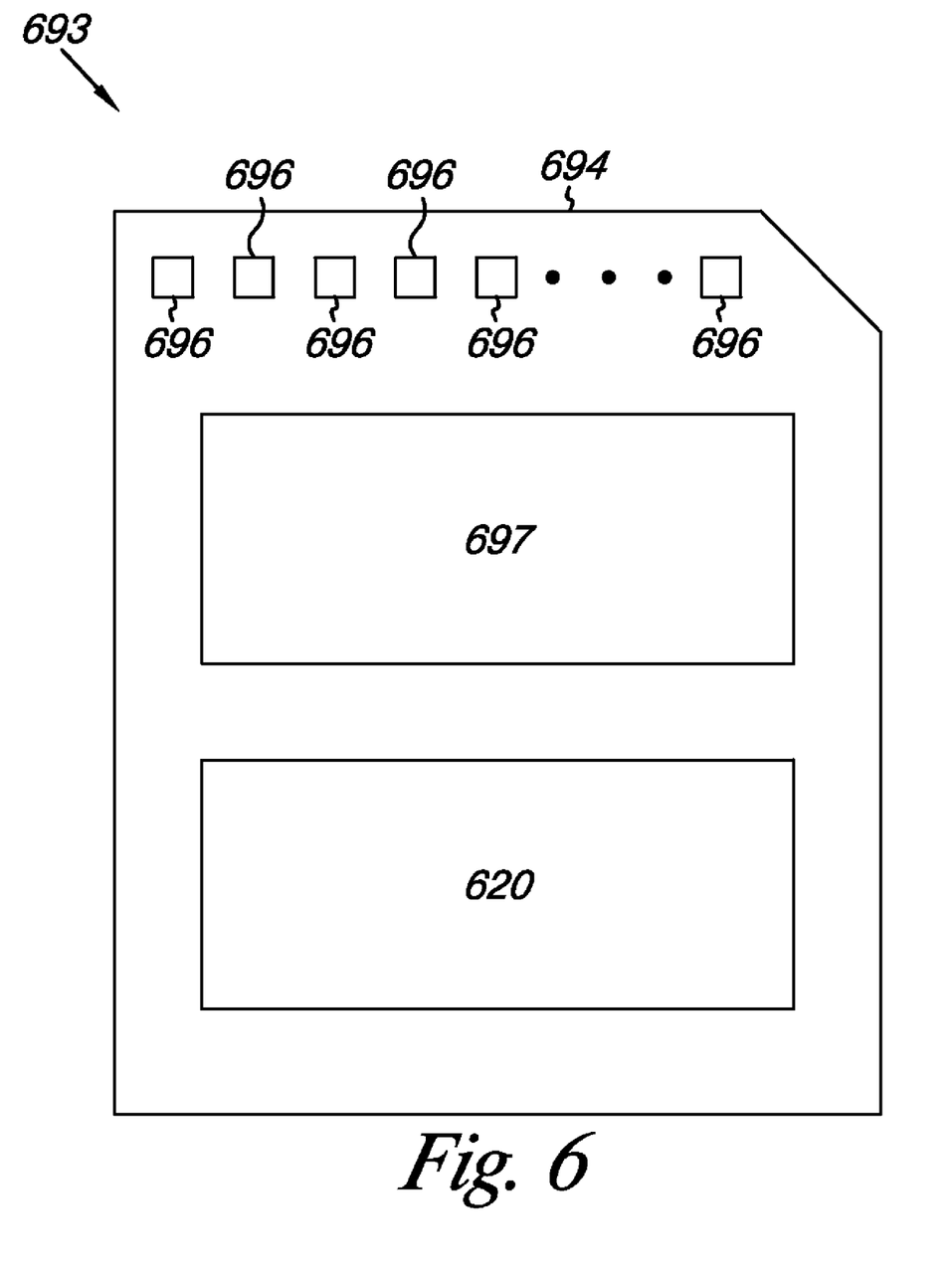
FIG. 6 is a block diagram of a memory module having at least one memory device in accordance with one or more embodiments of the present disclosure.

FIG. 6 is a functional block diagram of a memory module 693 having at least one memory device operated in accordance with one or more embodiments of the present disclosure. Memory module 693 is illustrated as a memory card, although the concepts discussed with reference to memory module 693 are applicable to other types of removable or portable memory (e.g., USB flash drives and/or solid-state drives) and are intended to be within the scope of "memory module" as used herein. In addition, although one example form factor is depicted in FIG. 6, these concepts are applicable to other form factors as well.

In one or more embodiments, memory module 693 will include a housing 694 (as depicted) to enclose one or more memory devices 620, though such a housing is not essential to all devices or device applications. At least one memory device 620 includes an array of non-volatile multilevel memory cells. Where present, the housing 694 includes one or more contacts 696 for communication with a host device. Examples of host devices include digital cameras, digital recording and playback devices, PDAs, personal computers, memory card readers, interface hubs and the like. For one or more embodiments, the contacts 696 are in the form of a standardized interface. For example, with a USB flash drive, the contacts 696 might be in the form of a USB Type-A male connector. For one or more embodiments, the contacts 696 are in the form of a semi-proprietary interface, such as might be found on CompactFlash™ memory cards licensed by SanDisk Corporation, Memory Stick™ memory cards licensed by Sony Corporation, SD Secure Digital™ memory cards licensed by Toshiba Corporation and the like. In general, however, contacts 696 provide an interface for passing control, address and/or data signals between the memory module 693 and a host having compatible receptors for the contacts 696.

The memory module 693 may optionally include additional circuitry 697, which may be one or more integrated circuits and/or discrete components. For one or more embodiments, the additional circuitry 697 may include control circuitry, such as a memory controller, for controlling access across multiple memory devices 620 and/or for providing a translation layer between an external host and a memory device 620. For example, there may not be a one-to-one correspondence between the number of contacts 696 and a number of connections to the one or more memory devices 620. Thus, a memory controller could selectively couple an I/O connection (not shown in FIG. 6) of a memory device 620 to receive the appropriate signal at the appropriate I/O connection at the appropriate time or to provide the appropriate signal at the appropriate contact 696 at the appropriate time. Similarly, the communication protocol between a host and the memory module 693 may be different than what is used for access of a memory device 620. A memory controller could then translate the command sequences received from a host into the appropriate command sequences to achieve the desired access to the memory device 620. Such translation may further include changes in signal voltage levels in addition to command sequences.

The additional circuitry 697 may further include functionality unrelated to control of a memory device 620 such as logic functions as might be performed by an ASIC. Also, the additional circuitry 697 may include circuitry to restrict read or write access to the memory module 693, such as password protection, biometrics or the like. The additional circuitry 697 may include circuitry to indicate a status of the memory module 693. For example, the additional circuitry 697 may include functionality to determine whether power is being supplied to the memory module 693 and whether the memory module 693 is currently being accessed, and to display an indication of its status, such as a solid light while powered and a flashing light while being accessed. The additional circuitry 697 may further include passive devices, such as decoupling capacitors to help regulate power requirements within the memory module 693.

CONCLUSION

The present disclosure includes methods and devices for logical memory blocks. One method for operating a memory device includes receiving a command to operate X pages of the memory device, X being greater than Y, and executing the command by executing multiple subcommands, each subcommand operating on a logical memory block portion of the X pages, each logical memory block including at most Y pages. T is a timeout limit, N is a number of pages comprising a block of memory, and Y is number of pages that can be operated within time T.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the fill range of equivalents to which such claims are entitled In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for operating a memory device, comprising:
receiving, to the memory device from a host system, a command to operate X pages of the memory device, X being greater than Y; and
replacing the command into multiple subcommands;
executing the replaced command by executing the multiple subcommands, each subcommand operating on a logical memory block portion of the X pages, each logical memory block including at most Y pages,
wherein T is a timeout limit, N is a number of pages comprising a block of memory, and Y is a number of pages that can be operated within time T.

2. The method of claim 1, wherein X equals N.

3. The method of claim 2, wherein executing the command includes executing a first subcommand to operate M pages of the memory device, and executing a second subcommand to operate N-M pages of the memory device.

4. The method of claim 3, wherein M equals Y.

5. The method of claim 3, wherein M does not equal Y.

6. The method of claim 5, wherein M equals Y.

7. The method of claim 3, wherein M is determined to be a percentage of the N pages.

8. The method of claim 2, wherein the command is a BLOCK COPY operation.

9. The method of claim 2, wherein T is a communication protocol timeout limit.

10. The method of claim 9, wherein T is determined from a Multi-Media Card (MMC) communication protocol standard.

11. The method of claim 9, wherein T is determined from a Secure Disk (SD) communication protocol standard.

12. The method of claim 11, wherein T is about 250 mS.

13. A method for operating a memory device, comprising:
receiving a first command to operate X pages of the memory device;
executing a first subcommand la implementing a first portion of the first command and operating on a first logical memory block (LMB) portion of the X pages, the first LMB including at most a number of pages that can be operated within a communication protocol standard timeout limit;
signaling capacity to receive another command after executing the first subcommand;
receiving a second command to operate the memory device;
executing the second command; and
executing a second subcommand after executing the second command by implementing a second portion of the first command and operating on a second LMB portion of the X pages, the second LMB including at most a number of pages that can be operated within a communication protocol standard timeout limit.

14. The method of claim 13, wherein the second LMB includes the number of pages that can be operated within a communication protocol standard timeout limit measured from receiving the second command.

15. The method of claim 14, wherein the second LMB includes the portion of the X pages not included in the first LMB.

16. The method of claim 14, wherein the second LMB includes less than the portion of the X pages not included in the first LMB.

17. The method of claim 16, further comprising:
signaling capacity to receive another command after executing the second subcommand;
receiving a third command to operate the memory device;
executing the third command; and
executing a third subcommand after executing the third command by implementing a third portion of the first command and operating on a third LMB portion of the X pages, the third LMB including at most a number of pages that can be operated within a communication protocol standard timeout limit.

18. The method of claim 17, wherein the third LMB includes the number of pages that can be operated within a communication protocol standard timeout limit measured from receiving the third command.

19. The method of claim 18, wherein the third LMB includes the portion of the X pages not included in either of the first or second LMBs.

20. A method for operating a memory device, comprising:
receiving a data move command to the memory device from a host system involving a source block of the memory device;

replacing the data move command with multiple data move subcommands;
executing the replaced data move command by executing the multiple data move subcommands, each data move subcommand:
reading content of a page from the source block; and
programming a page in a destination block of the memory device with the content of the page read from the source block page;
wherein the multiple data move subcommands involve at most a remaining number of pages that can be read and programmed within a timeout limit associated with completion of the data move command.

21. The method of claim 20, further comprising:
determining availability of an erased block of memory for use as the destination block of memory;
erasing a block of memory for use as the destination block of memory where an erased block of memory is not available; and
transferring the content of a page from the source block external to the memory device to check for data propagation errors,
wherein checking for data propagation errors include detecting and correcting data propagation errors.

* * * * *

UNITED STATES PATENT AND TRADEMARK OFFICE
CERTIFICATE OF CORRECTION

PATENT NO. : 8,099,543 B2  
APPLICATION NO. : 12/364923  
DATED : January 17, 2012  
INVENTOR(S) : Ryan G. Fisher Page 1 of 1

It is certified that error appears in the above-identified patent and that said Letters Patent is hereby corrected as shown below:

On the Title Page, Item (54), in "Title", in column 1, line 1, delete "OPERARTING" and insert -- OPERATING --, therefor.

IN THE SPECIFICATIONS:

In column 1, line 1, delete "OPERARTING" and insert -- OPERATING --, therefor.

IN THE CLAIMS:

In column 14, line 19, in Claim 13, delete "la" and insert -- by --, therefor.

Signed and Sealed this  
Thirteenth Day of March, 2012

David J. Kappos  
*Director of the United States Patent and Trademark Office*